United States Patent
Jolly et al.

(10) Patent No.: US 11,693,363 B2
(45) Date of Patent: Jul. 4, 2023

(54) NEAR-TO-EYE AND SEE-THROUGH HOLOGRAPHIC DISPLAYS

(71) Applicant: Massachusetts Institute of Technology, Cambridge, MA (US)

(72) Inventors: Sundeep Jolly, Boston, MA (US); Nickolaos Savidis, Rochester, NY (US); V. Michael Bove, Jr., Wrentham, MA (US); Bianca Datta, Cambridge, MA (US); Daniel E. Smalley, Provo, UT (US)

(73) Assignee: Massachusetts Institute of Technology, Cambridge, MA (US)

( * ) Notice: Subject to any disclaimer, the term of this patent is extended or adjusted under 35 U.S.C. 154(b) by 183 days.

(21) Appl. No.: 16/945,788

(22) Filed: Jul. 31, 2020

(65) Prior Publication Data
US 2021/0080906 A1    Mar. 18, 2021

Related U.S. Application Data

(63) Continuation of application No. 15/658,388, filed on Jul. 24, 2017, now abandoned.
(Continued)

(51) Int. Cl.
*G02B 6/04* (2006.01)
*G03H 1/02* (2006.01)
(Continued)

(52) U.S. Cl.
CPC ............ *G03H 1/0248* (2013.01); *G02B 5/32* (2013.01); *G02B 6/005* (2013.01); *G02B 6/0016* (2013.01);
(Continued)

(58) Field of Classification Search
CPC ...... G03H 1/0248; G03H 1/0005; G02B 5/32; G02B 6/0016; G02B 6/005;
(Continued)

(56) References Cited

U.S. PATENT DOCUMENTS 3,874,782 A * 4/1975 Schmidt ................. G02F 1/011
385/7
5,106,181 A * 4/1992 Rockwell, III ....... G02F 1/3132
385/116
(Continued)

*Primary Examiner* — Audrey Y Chang
(74) *Attorney, Agent, or Firm* — Norma E. Henderson

(57) ABSTRACT

A holographic display is comprised of space-multiplexed elemental modulators, each of which consists of a surface acoustic wave transducer atop an anisotropic waveguide. Each "line" of the overall display consists of a single anisotropic waveguide across the display's length with multiple surface acoustic wave transducers spaced along the waveguide length, although for larger displays, the waveguide may be divided into segments, each provided with separate illumination. Light that is undiffracted by a specific transducer is available for diffraction by subsequent transducers. Per transducer, guided-mode light is mode-converted to leaky-mode light, which propagates into the substrate away from the viewer before encountering a volume reflection grating and being reflected and steered towards the viewer. The display is transparent and all reflection volume gratings operate in the Bragg regime, thereby creating no dispersion of ambient light.

20 Claims, 7 Drawing Sheets

Related U.S. Application Data

(60) Provisional application No. 62/365,973, filed on Jul. 22, 2016.

(51) Int. Cl.

| | | |
|---|---|---|
| *F21V 8/00* | (2006.01) | |
| *G02B 27/01* | (2006.01) | |
| *G02F 1/33* | (2006.01) | |
| *G02F 1/335* | (2006.01) | |
| *G02B 5/32* | (2006.01) | |
| *G03H 1/00* | (2006.01) | |
| *G03H 1/26* | (2006.01) | |
| *G03H 1/22* | (2006.01) | |
| *G02B 6/34* | (2006.01) | |

(52) U.S. Cl.
CPC ....... *G02B 6/0078* (2013.01); *G02B 27/0172* (2013.01); *G02F 1/332* (2013.01); *G02F 1/335* (2013.01); *G03H 1/0005* (2013.01); *G03H 1/2286* (2013.01); *G03H 1/2645* (2013.01); *G02B 6/34* (2013.01); *G02B 2027/014* (2013.01); *G02B 2027/015* (2013.01); *G02B 2027/0123* (2013.01); *G02B 2027/0174* (2013.01); *G02F 2201/124* (2013.01); *G02F 2201/307* (2013.01); *G02F 2202/20* (2013.01); *G02F 2203/07* (2013.01); *G03H 2001/0088* (2013.01); *G03H 2223/16* (2013.01); *G03H 2223/23* (2013.01); *G03H 2223/24* (2013.01); *G03H 2225/21* (2013.01); *G03H 2225/60* (2013.01); *G03H 2226/02* (2013.01); *G03H 2227/02* (2013.01)

(58) Field of Classification Search
CPC ........ G02B 27/0172; G02B 2027/0123; G02B 2027/014; G02B 2027/015; G02B 6/26; G02F 1/332
USPC ................. 359/395, 15, 34, 569, 305; 385/2
See application file for complete search history.

(56) References Cited

U.S. PATENT DOCUMENTS

| | | | |
|---|---|---|---|
| 2002/0141039 A1* | 10/2002 | Mermelstein | G02F 1/335 359/305 |
| 2014/0300695 A1* | 10/2014 | Smalley | G02F 1/011 348/40 |
| 2017/0094265 A1* | 3/2017 | Mullins | G02B 27/0179 |

\* cited by examiner

NEAR-TO-EYE AND SEE-THROUGH HOLOGRAPHIC DISPLAYS

RELATED APPLICATIONS

This application is a continuation of U.S. patent application Ser. No. 15/658,388, filed Jul. 24, 2017, which claims the benefit of U.S. Provisional Application Ser. No. 62/365,973, filed Jul. 22, 2016, the entire disclosure of which is herein incorporated by reference.

STATEMENT REGARDING FEDERALLY SPONSORED RESEARCH OR DEVELOPMENT

This invention was made with U.S. Government Support under Grant Number FA8650-14-C-6571, awarded by the Air Force Research Laboratory. The Government has certain rights in this invention.

FIELD OF THE TECHNOLOGY

The present invention relates to holographic video displays and, in particular, to a transparent flat-panel holographic video display suitable for near-to-eye and see-through augmented reality applications.

BACKGROUND

The limitations and affordances of holographic video displays are chiefly dictated by the spatial light modulators upon which they are built. The temporal bandwidth of the spatial light modulator determines the display size, view angle, and frame rate. The pixel pitch determines the angle of the display or the power of the lenses needed to achieve a wide view angle. The space-bandwidth product, which is related to the numerical aperture of the holographic grating, determines the maximum depth range and number of resolvable views the display will possess. Finally, optical non-idealities of the modulator give rise to noise and artifacts in the display output.

Current state-of-the-art technologies for spatial light modulation, such as liquid crystal (LC), micro-electro-mechanical systems (MEMS) [Kreis, T., Aswendt, P., and Hofling, R., "Hologram reconstruction using a digital micro-mirror device," Optical Engineering, vol. 40, pp. 926-933 (2001); Pearson, E., "MEMS spatial light modulator for holographic displays", S.M. Thesis, Massachusetts Institute of Technology (2001)], and bulk-wave acousto-optic modulators [Hilaire, P., Benton, S., and Lucente, M., "Synthetic aperture holography: a novel approach to three-dimensional displays," Journal of the Optical Society of America A, vol. 9, pp. 1969-1977 (1992)], have proven challenging to employ in holographic video displays. The modulators employed currently are challenging to use for several reasons: low bandwidth (relative to holograms), high cost, low diffraction angle, poor scalability, quantization error, and the presence of noise, unwanted diffractive orders, and zero-order light, as well as the requirement for spatial or temporal multiplexing of color. These issues must therefore be addressed before using these modulators in a holographic display system.

Much of the cost and complexity of modern holographic displays is due to efforts to compensate for these deficiencies by, for example, adding eye tracking to deal with low diffraction angle [Haussler, R., Schwerdtner, A., and Leister, N., "Large holographic displays as an alternative to stereoscopic displays," Proceedings of SPIE Stereoscopic Displays and Applications XIX, p. 68030M (2008)], duplicating and phase shifting the optical path in order to eliminate the zero order [Chen, G.-L., Lin, C.-Y., Kuo, M.-K., and Chang, C.-C., "Numerical suppression of zero-order image in digital holography." Optics Express, vol. 15, pp. 8851-8856 (2007)], or creating large arrays of spatial light modulators in order to increase the display size [Sato, K., A. Sugita, M. Morimoto, and K. Fujii, "Reconstruction of Color Images at High Quality by a Holographic Display", Proc. SPIE Practical Holography XX, p. 6136 (2006)]. The cost and complexity of holographic video displays can be greatly reduced if a spatial light modulator can be made to have better affordances than the LC and MEMS devices that are currently employed.

Full-color, video-rate holographic stereograms using arrays of waveguides with acoustic grating patterns that diffract in one axis only (horizontal parallax only or HPO) have previously been produced [D. Smalley, Q. Smithwick, V. M. Bove, Jr., J. Barabas, S. Jolly, "Anisotropic leaky-mode modulator for holographic video displays." Nature 498.7454, pp. 313-317 (2013); D. Smalley, Q. Smithwick, J. Barabas, V. M. Bove, Jr., S. Jolly, and C DellaSilva, "Holovideo for everyone: a low-cost holovideo monitor," Proc. 9th International Symposium on Display Holography (ISDH 2012) (2012)]. The advantages of polarization rotation, enlarged angular diffraction, and wavelength division for red, green, and blue light have therefore been demonstrated.

SUMMARY

In one aspect, the present invention is a transparent holographic video display system that is suitable for near-to-eye augmented reality and see-through applications. Based on monolithic guided-wave acousto-optics with integrated volume gratings, a preferred embodiment has a composite display comprised of space-multiplexed elemental modulators, each of which exploit leaky-mode diffraction of guided-mode light. Each elemental modulator consists of a surface acoustic wave transducer atop an anisotropic waveguide. In a typical implementation, each "line" of the overall display consists of a single anisotropic waveguide across the display's length, with multiple surface acoustic wave transducers spaced along the length of the waveguide. For larger displays, the waveguide may be divided into segments, with each being provided with separate illumination. Light that is undiffracted by a specific transducer is available for diffraction by subsequent transducers. Per transducer, guided-mode light is mode-converted to leaky-mode light, which propagates into the substrate away from the viewer before encountering a volume reflection grating and being reflected and steered towards the viewer. The display is transparent and all reflection volume gratings operate in the Bragg regime, thereby creating no dispersion of ambient light.

In one aspect of the invention, a holographic video display comprises a plurality of space-multiplexed elemental modulators. Each elemental modulator is configured to employ leaky-mode diffraction of guided-mode light to produce a line of a holographic display and includes an anisotropic waveguide, at least one in-coupling reflection grating positioned on the anisotropic waveguide at a location suitable for coupling incident light into the waveguide to produce guided-mode light travelling in the waveguide, at least one surface acoustic wave transducer disposed along the top of the anisotropic waveguide, wherein each surface acoustic wave transducer is configured to diffract the guided-mode light travelling in the waveguide into leaky-mode light, and at least one volume reflection grating positioned on the anisotropic waveguide, each volume reflection grating being positioned at a location suitable for steering the leaky-mode light towards a viewer.

The display may include an electrical control layer comprising a graphics processing unit, circuitry for RF up-conversion and amplification, and a multiplexor for switching amongst holographic lines to drive multiple holographic lines in sequence. It include a substrate on which the plurality of elemental modulators are disposed. The substrate may be lithium niobate. Each waveguide may be divided into segments, each provided with separate illumination. The display may be transparent and all reflection volume gratings may operate in the Bragg regime. Each waveguide may be associated with multiple one-to-one associated acoustic transducers and volume reflection gratings, arranged along the anisotropic waveguide to produce multiple output lines. There may be multiple acoustic transducers disposed along the anisotropic waveguide in order to provide a desired length of optical line. The invention includes any holographic video image created by the display.

In another aspect of the invention, a method for generating a holographic image includes providing one or more wavelengths of light to a holographic video display, the display comprising a plurality of space-multiplexed elemental modulators, providing holographic information to the video display; coupling the light received at the holographic video display into the elemental modulators for diffraction according to the holographic information; and scanning the steered light to form the holographic image. Each elemental modulator is configured to employ leaky-mode diffraction of guided-mode light to produce a line of a holographic display and includes an anisotropic waveguide, at least one in-coupling reflection grating positioned on the anisotropic waveguide at a location suitable for coupling incident light into the waveguide to produce guided-mode light travelling in the waveguide, at least one surface acoustic wave transducer disposed along the top of the anisotropic waveguide, wherein each surface acoustic wave transducer is configured to diffract the guided-mode light travelling in the waveguide into leaky-mode light, and at least one volume reflection grating positioned on the anisotropic waveguide, each volume reflection grating being positioned at a location suitable for steering the leaky-mode light towards a viewer. The invention includes a holographic video display that employs the method.

BRIEF DESCRIPTION OF THE DRAWINGS

Other aspects, advantages and novel features of the invention will become more apparent from the following detailed description of the invention when considered in conjunction with the accompanying drawings, wherein:

FIGS. 12A-C depict index ellipsoids for uniaxial lithium niobate, wherein FIG. 12A depicts unperturbed $LiNbO_3$, FIG. 12B depicts proton-exchanged $LiNbO_3$, and FIG. 12C depicts femtosecond laser photo-perturbed $LiNbO_3$.

DETAILED DESCRIPTION

Figure 1:
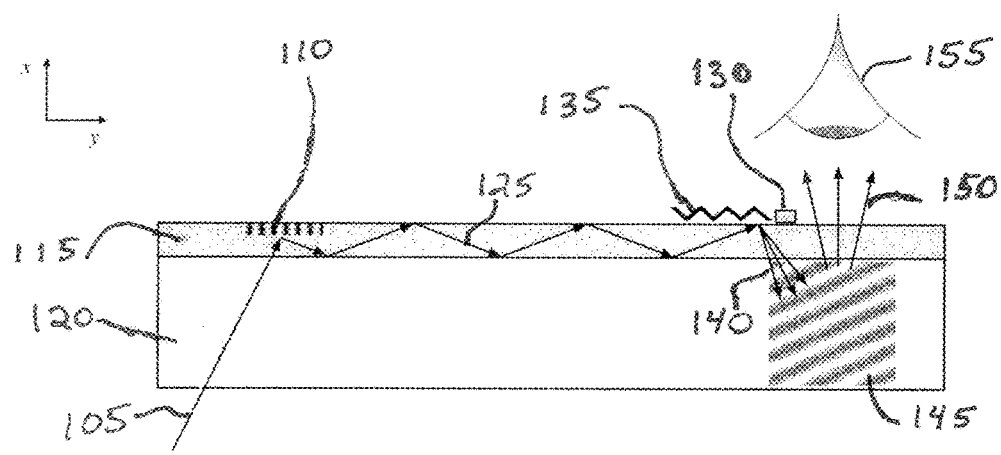
FIG. 1 is an x-y cross-section (side view) of an example guided optical wave SAW device with integrated Bragg gratings, according to one aspect of the invention.

A flat-panel, transparent holographic display solution suitable for near-to-eye augmented reality applications according to the invention is based on monolithic guided-wave acousto-optics with integrated volume gratings. A preferred embodiment has a composite display comprised of space-multiplexed elemental modulators, each of which exploit leaky-mode diffraction of guided-mode light. Fabrication of modulator sub-components may be achieved via femtosecond laser micromachining processes.

The display is comprised of space-multiplexed elemental modulators, each of which consists of a surface acoustic wave transducer atop an anisotropic waveguide. Each "line" of the overall display typically consists of a single anisotropic waveguide across the display's length with multiple surface acoustic wave transducers spaced along its length, although for larger displays, the waveguide may be divided into segments, each provided with separate illumination. Light that is undiffracted by a specific transducer is available for diffraction by subsequent transducers. Per transducer, guided-mode light is mode-converted to leaky-mode light, which propagates into the substrate away from the viewer before encountering a volume reflection grating and being reflected and steered towards the viewer. The display is transparent and all reflection volume gratings operate in the Bragg regime, thereby creating no dispersion of ambient light.

The present invention builds on and employs the guided-wave light modulation technologies previously described in U.S. patent application Ser. No. 14/985,453, U.S. Pat. No. 8,149,265, U.S. patent application Ser. No. 13/437,850, U.S. patent application Ser. No. 14/213,333, and U.S. patent application Ser. No. 14/217,215, all of which are incorporated by reference herein in their entirety. As a method for transparent display, it allows for augmented reality applications naturally. The use of integrated reflection volume gratings to direct leaky-mode diffracted light towards a viewer presents an extremely light-efficient solution for direct viewing of the displayed 3-D wavefield from the surface of the modulator without any additional requisite supporting optics. As a flat, transparent holographic display, the solution has natural applications in augmented reality but can also be adapted for virtual reality. Larger versions of the device could be used in heads-up displays, see-through hand-held devices, and similar applications.

A preferred embodiment of a system according to the invention employs a guided-wave acousto-optic platform implemented in lithium niobate (LiNbO$_3$), in order to realize a fully-monolithic, transparent, flat-panel holographic video display.

Basic Optical Principles. The optical design employs several concepts that have already been explored in other contexts: (1) the use of anisotropic guided-wave acousto-optics for spatial light modulation in holographic video displays [D. E. Smalley, Holovideo on a Stick: Integrated Optics for Holographic Video Displays, Ph. D. Thesis, Massachusetts Institute of Technology, 2013; D. E. Smalley, Q. Y. J. Smithwick, V. M. Bove, Jr., J. Barabas and S. Jolly, "Anisotropic leaky-mode modulator for holographic video displays," Nature, v. 498, pp. 313-317, 2013] via a guided-to-leaky mode transition in birefringent LiNbO$_3$ [D. V. Petrov and J. Ctyroky, "Acousto-optic conversion of a guided mode into a leaky wave in a Ti:LiNbO3 waveguide," Pis'ma v Zhurnal Tekhnicheskoi Fiziki, vol. 9, pp. 1120-1124, September 1983; A. M. Matteo, C. S. Tsai, and N. Do, "Collinear guided wave to leaky wave acoustooptic interactions in proton-exchanged LiNbO$_3$ waveguides," IEEE Trans. Ultrason., Ferroelect., Freq. Contr., vol. 47, no. 1, pp. 16-28], (2) the use of a Bragg grating to introduce illumination into a waveguide [C. S. Tsai, Guided-Wave Acousto-Optics: Interactions Devices and Applications. Springer-Verlag, 1990], (3) the use of beam strobing in order to "freeze" the acousto-optic pattern and eliminate the need for de-scanning the propagating acoustic wave [W. Akemann, J.-F. Lager, C. Ventalon, B. Mathieu, S. Dieudonné, and L. Bourdieu, "Fast spatial beam shaping by acousto-optic diffraction for 3D non-linear microscopy," Optics Express, vol. 23, no. 22, pp. 28191-28205, November 2015], and (4) the use of a volume holographic Bragg reflection grating in order to reflect the leaky diffracted toward a viewer with high efficiency [H. Kogelnik, "Coupled wave theory for thick hologram gratings," The Bell System Technical Journal, 1969; J. Hukriede, D. Runde, and D. Kip, "Fabrication and application of holographic Bragg gratings in lithium niobate channel waveguides," J. Phys. D: Appl. Phys., vol. 36, no. 3, pp. R1-R16, February 2003]. All elements, including the in-coupling grating, anisotropic waveguide, and output volume hologram, can be realized within a single LiNbO$_3$ substrate without the need for any additional supporting optics. The platform therefore provides a path towards a fully-monolithic, integrated-optic platform for transparent holographic video display for near-to-eye display and other see-through display applications.

Figure 2:
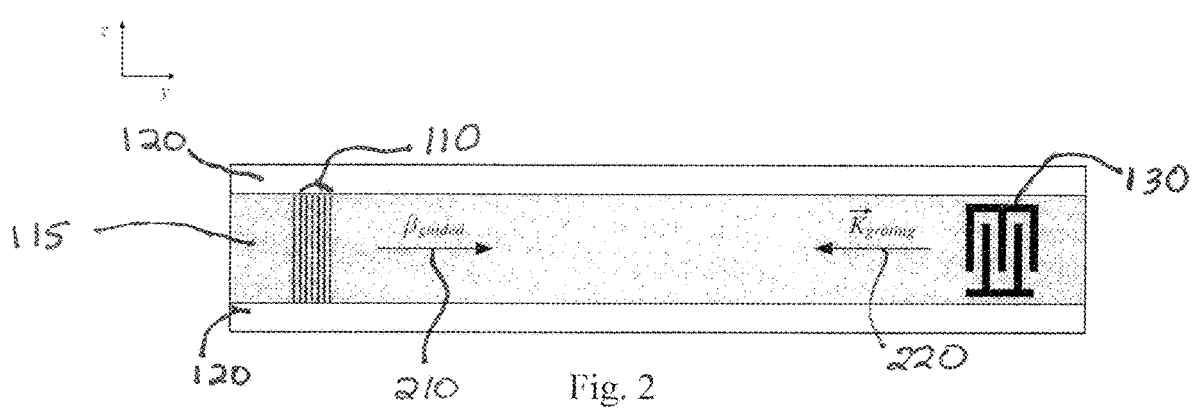
FIG. 2 is a z-y cross-section (top view) of the guided optical wave SAW device of FIG. 1, according to one aspect of the invention.

FIGS. 1 and 2 depict the basic structure of an example guided optical wave surface acoustic device according to a preferred embodiment of the invention. For x-cut LiNbO$_3$, the z-axis is the extraordinary axis.

FIG. 1 is an x-y cross-section (side view) of a guided optical wave SAW device with integrated Bragg gratings, according to one aspect of the invention. In the device of FIG. 1, the incident light 105 is linearly polarized in the TE orientation and is reflected off surface (TE) Bragg in-coupling reflection grating 110, which couples it into anisotropic (TE) waveguide 115 ($n_e > n_{e0}$) on bulk X-cut lithium niobate ($n_{e0}$, $n_{oO}$) substrate 120, producing guided-mode light 125. The waveguide 115 has an extraordinary index perturbation of $\Delta n_e$ relative to the substrate 120, but no ordinary index change. When excited by an RF signal containing the holographic information, the interdigitated electrodes 130 (pictured in FIG. 2) launch a surface acoustic wave (SAW) 135. The guided-mode light 125 interacts with the SAW 135 and is mode-converted into a diffracted TM mode that exits the waveguide as a leaky mode 140. Upon entering the substrate region 120, the leaky mode 140 is incident upon a reflection mode volume holographic Bragg grating 145 ($\Delta n_e$, $\Delta n_o$) with grating vector nearly parallel to the center wavevector of the incident leaky mode's angular fan. Due to the volume hologram's wide angular acceptance range (see FIG. 3), the leaky mode is reflected 150 to exit substrate 120 through the waveguide 115 towards the viewer 155.

FIG. 2 is a z-y cross-section (top view) of the example SAW device of FIG. 1. For x-cut LiNbO$_3$, the z-axis is the extraordinary axis. In FIG. 2, $\beta_{guided}$ 210 is the propagation constant of the guided-mode TE light 125 (FIG. 1) in the waveguide 115 and $\vec{\kappa}_{grating}$ 220 is the acoustic grating's wavevector. These quantities obey the conservation relationship depicted in FIG. 4.

Established frequency-division mutliplexing schemes for full-color operation [D. E. Smalley, Holovideo on a Stick: Integrated Optics for Holographic Video Displays, Ph. D. Thesis, Massachusetts Institute of Technology, 2013; D. E. Smalley, Q. Y. J. Smithwick, V. M. Bove, Jr., J. Barabas and S. Jolly, "Anisotropic leaky-mode modulator for holographic video displays," Nature, v. 498, pp. 313-317, 2013] can similarly be applied to the device. The device can also be operated for use in a scanning retinal display [B. T. Schowengerdt and E. J. Seibel, "Stereoscopic retinal scanning laser display with integrated focus cues for ocular accommodation," Proceedings of SPIE/IS&T Stereoscopic Displays and Virtual Reality Systems XI, vol. 5291, 2004].

Figure 3:
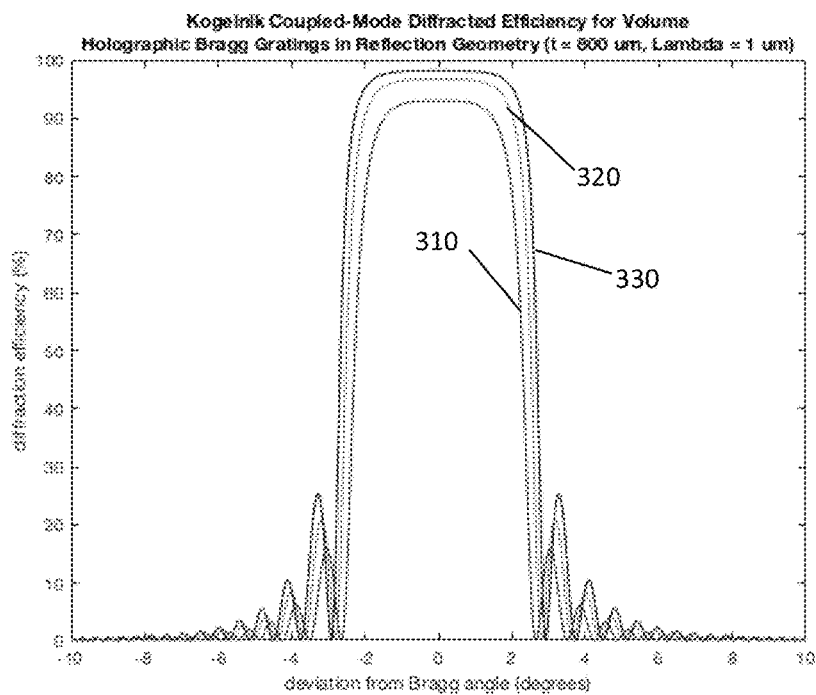
FIG. 3 depicts diffraction efficiency for red, green, and blue wavelengths vs. angular deviation from the Bragg angle for a reflection-mode volume holographic Bragg grating with $\Lambda=1$ μm and thickness of 800 μm as indicated by Kogelnik's coupled-mode theory.

FIG. 3 depicts the calculated diffraction efficiency for red 310, green 320, and blue 340 wavelengths vs. angular deviation from the Bragg angle for a reflection-mode volume holographic Bragg grating with $\Lambda=1$ μm and thickness of 800 μm, as indicated by Kogelnik's coupled-mode theory [H. Kogelnik, "Coupled wave theory for thick hologram gratings," The Bell System Technical Journal, 1969; I. V. Ciapurin, L. B. Glebov, and V. I. Smirnov, "Modeling of Gaussian beam diffraction on volume Bragg gratings in PTR glass," Proceedings of SPIE Practical Holography XIX: Materials and Applications, vol. 5742, pp. 183-194, April 2005]. The wide angular acceptance range allows for the total angular extent of a leaky mode to be reflected with high efficiency. Furthermore, wavelength mutliplexing of several Bragg holograms can enable full-color operation [G. Barbastathis and D. Psaltis, "Volume holographic multiplexing methods in Holographic Data Storage, Eds: H. Coufal, D. Psaltis, and G. Sincerbox. Springer, New York, 2000].

Figure 4:
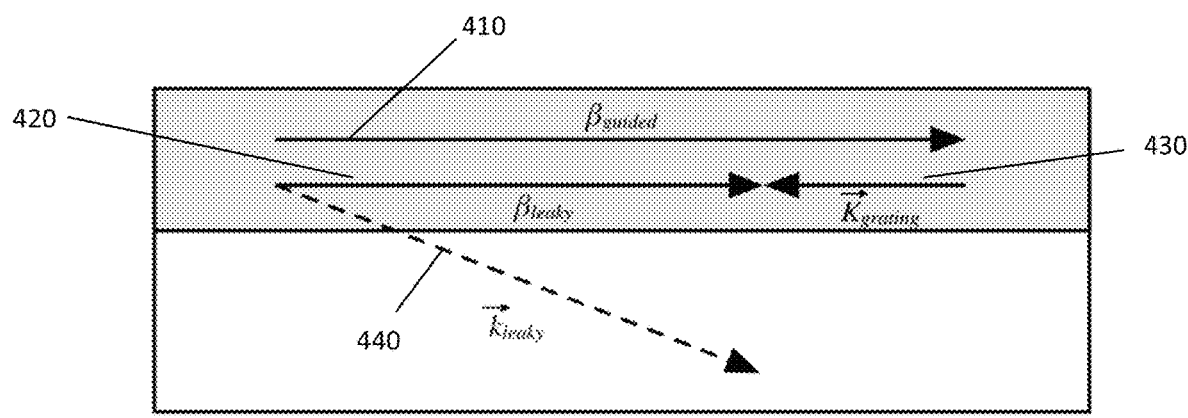
FIG. 4 depicts conservation of momentum in a nearly collinear acousto-optic guided-to-leaky mode transition.

FIG. 4 depicts conservation of momentum (phase-matching condition) in a nearly collinear acousto-optic guided-to-leaky mode transition $\beta_{guided}$ is the propagation vector of the TE-polarized guided mode light (i.e., the component of the guided mode wavevector along the propagation direction), $\beta_{leaky}$ is the component of the TM-polarized leaky mode light along the waveguide axis, $\overrightarrow{\kappa}$ grating is the acoustic grating wavevector, and

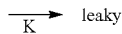 leaky is the total wavevector of the leaky mode light.

The device pictured in FIGS. 1 and 2 represents a single acousto-optic element capable of modulating only some portion of a holographic image (i.e., in an elemental hologram sense). This is due to the fact that the surface acoustic wave has only a limited interaction length with the guided-mode light before the efficiency of the interaction approaches zero. Therefore, placement of several acousto-optic transducers on the same waveguide is necessary in order to obtain a longer holographic line.

Structurally, a multi-element device is comprised of multiple elements of the type depicted in FIG. 1. Guided-mode light that is undiffracted by a surface acoustic wave continues to propagate in the waveguide and is available for diffraction for subsequent surface acoustic waves. Multiple SAW transducers are positioned along the waveguide axis and interact progressively with guided-wave light in a resonant fashion. Volume holographic Bragg gratings are positioned for reflection of every leaky mode exiting the waveguide. This type of scheme is depicted in FIGS. 5 (side view) and 6 (top view).

Figure 5:
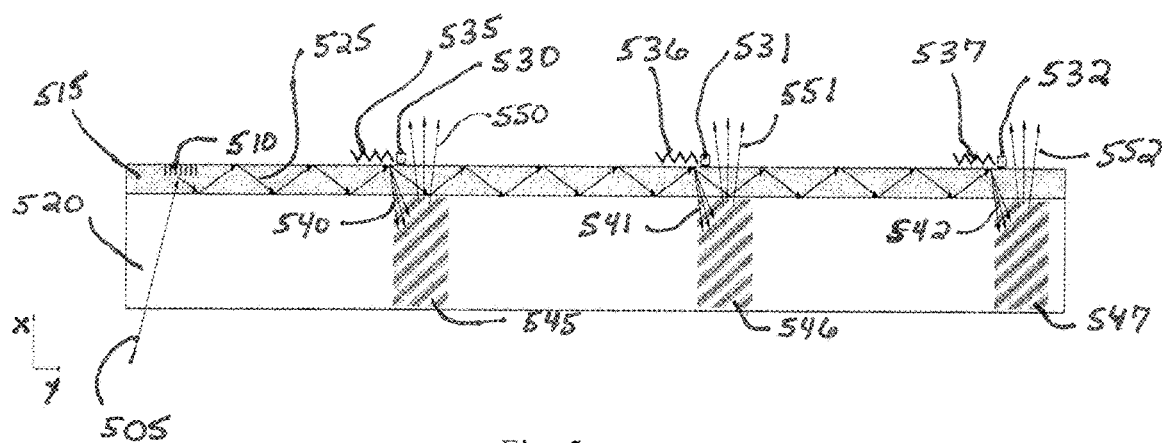
FIG. 5 is an x-y cross-section (side view) of an example multi-element SAW device, according to one aspect of the invention.

FIG. 5 is an x-y cross-section (side view) of an example multi-element SAW device, according to one aspect of the invention. As shown in FIG. 5, incident TE light 505 is reflected off surface (TE) Bragg in-coupling reflection grating 510 ($\Delta n_e$), which couples it into anisotropic (TE) waveguide 515 ($n_e > n_{eO}$) on bulk X-cut lithium niobate ($n_{eO}$, $n_{oO}$) substrate 520, producing guided-mode light 525. When excited by an RF signal containing the holographic information, the interdigitated electrodes 530, 531, 532 (pictured in FIG. 6) launch surface acoustic waves 535, 536, 537. The guided-mode light 525 interacts with the SAWs 535, 536, 537 and is mode-converted into diffracted TM modes that exits the waveguide as leaky modes 540 541, 542. Light 525 that is undiffracted by the first transducer 530 is available for diffraction by subsequent transducer 531, and so on. Upon entering the substrate region 520, leaky modes 540, 541, 542 are incident upon respective reflection mode volume holographic Bragg gratings 545, 546, 547 ($\Delta n_e$, $\Delta n_o$) with grating vectors nearly parallel to the center wavevector of the incident leaky mode's angular fan. The leaky modes are reflected 550, 551, 552 by respective reflection mode volume holographic Bragg gratings 545, 546, 547 to exit the substrate 520 through the waveguide 515 towards the viewer.

Figure 6:
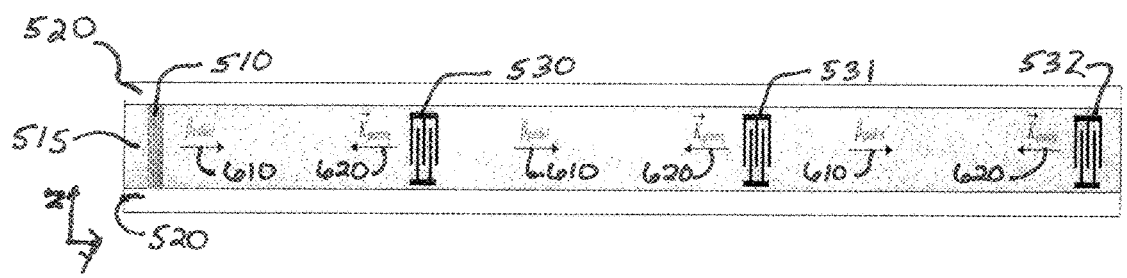
FIG. 6 is a z-y cross-section (top view) of the multi-element SAW Device of FIG. 5, according to one aspect of the invention.

FIG. 6 is a z-y cross-section (top view) of the multi-element SAW Device of FIG. 5, according to one aspect of the invention. In FIG. 6, $\beta_{guided}$ 610 is the propagation constant of the guided-mode TE light 525 (FIG. 5) in waveguide 515 and

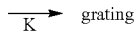 grating

620 is the acoustic grating's wavevector.

Systems Engineering. Strobed (pulsed laser illumination) operation has been presented as a solution to overcoming non-stationarity in acousto-optic modulators when used for beam shaping applications [W. Akemann, J.-F. Lager, C. Ventalon, B. Mathieu, S. Dieudonné, and L. Bourdieu, "Fast spatial beam shaping by acousto-optic diffraction for 3D non-linear microscopy," Optics Express, vol. 23, no. 22, pp. 28191-28205, November 2015]. Such a scheme can be used in place of polygonal mirror scanning techniques that have been applied previously for scanned-aperture holographic video displays based around acousto-optic modulators [D. E. Smalley, Holovideo on a Stick: Integrated Optics for Holographic Video Displays, Ph. D. Thesis, Massachusetts Institute of Technology, 2013; D. E. Smalley, Q. Y. J. Smithwick, V. M. Bove, Jr., J. Barabas and S. Jolly, "Anisotropic leaky-mode modulator for holographic video displays," Nature, v. 498, pp. 313-317, 2013; P. S. Hilaire, S. A. Benton, and M. Lucente, "Synthetic aperture holography: a novel approach to three-dimensional displays," Journal of the Optical Society of America A, vol. 9, no. 11, pp. 1969-1977, 1992; P. St. Hilaire, Scalable Optical Architectures for Electronic Holography, Ph. D. Thesis, Massachusetts Institute of Technology, 1994].

Figure 7:
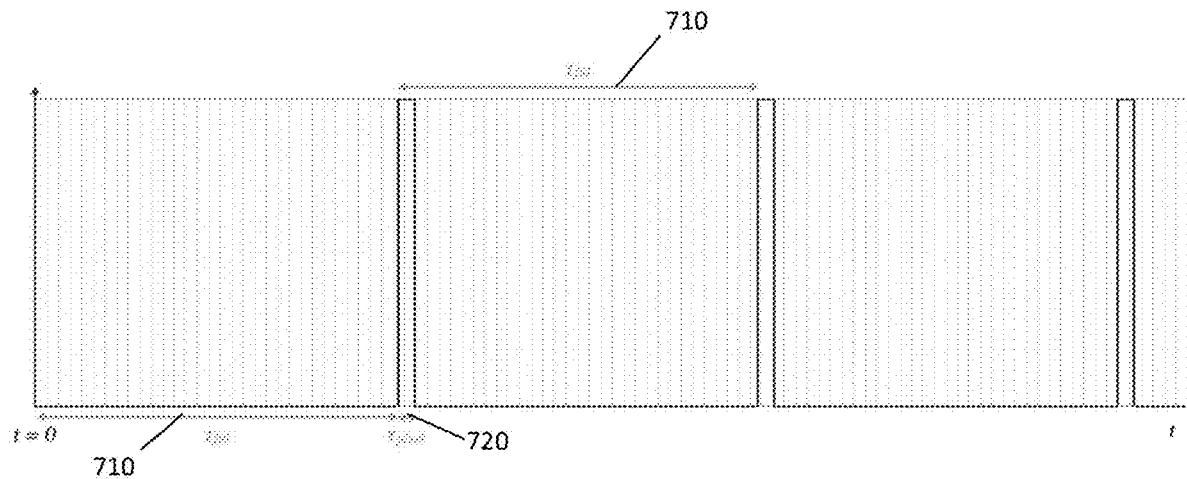
FIG. 7 is an example timing diagram for pulsed laser illumination of SAW devices.
Figure 8:
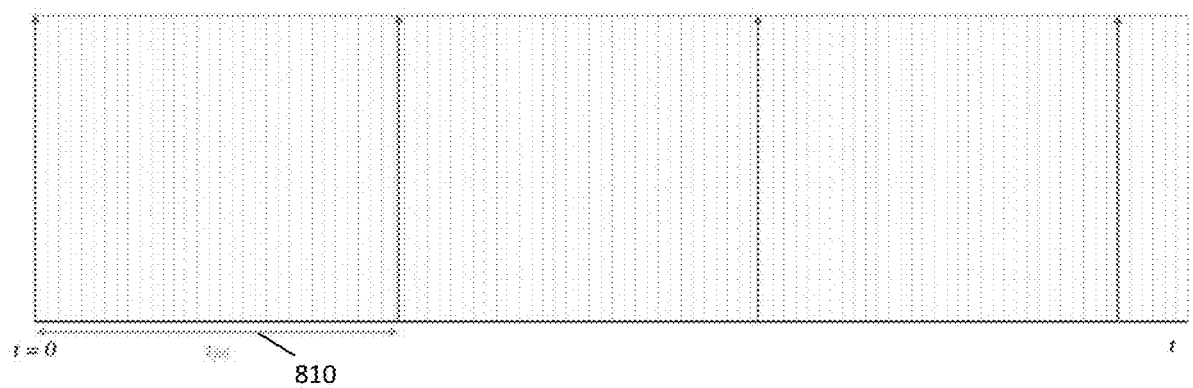
FIG. 8 is an example timing diagram for hsync pulses, with $\tau_{fill}$ being the time duration over which the aperture is filled by the acoustic pixel stream.

An example timing diagram for strobed operation of a device according to the invention is depicted in FIG. 7. In FIG. 7, $\tau_{fill}$ 710 is the time duration over which the aperture is filled by the acoustic pixel stream and $\tau_{pixel}$ 720 is the time duration over which a single pixel is acoustically drawn. The duty cycle is then $D=\tau_{pixel}/\tau_{fill}$. $\tau_{fill}$ can be found as $\tau_{fill}=l/v$, where l is the interaction length and v is the velocity of the propagating surface acoustic wave. For x-cut LiNbO$_3$, v=3909 m/s; assuming an interaction length l=1 cm, $\tau_{fill}$=2.558 µs. For a 400 Mpixel/s pixel clock from a modern graphics processing unit, $\tau_{pixel}$=1/400 Hz=2.5 ns. Each illumination pulse is tied to the length of time taken for the graphics processing unit to output one filled aperture's worth of pixels; this can readily be set to be one horizontal line on the GPU framebuffer and hence the pulses can be triggered on the GPU's hsync pulses (depicted in FIG. 8).

Where the GPU or other video generation circuitry does not support a sufficiently long line length for the necessary diffraction pattern, the aperture may be spread across multiple framebuffer lines and the illumination triggered by a counter driven by hsync pulses. FIG. 8 is an example timing diagram for hsync pulses, with $\tau_{fill}$ 810 being the time duration over which the aperture is filled by the acoustic pixel stream.

Each waveguide, being driven with either a single or multiple SAW transducers, is responsible for delivering a single horizontal parallax-only holographic line to the viewer. In order to deliver imagery with greater vertical resolution, multiple such holographic lines are required in the output. Scanned-aperture displays based around bulk-wave acousto-optic modulators [P. S. Hilaire, S. A. Benton, and M. Lucente, "Synthetic aperture holography: a novel approach to three-dimensional displays," Journal of the Optical Society of America A, vol. 9, no. 11, pp. 1969-1977, 1992; P. St. Hilaire, Scalable Optical Architectures for Electronic Holography, Ph. D. Thesis, Massachusetts Institute of Technology, 1994] or guided-wave acousto-optic devices [D. E. Smalley, Holovideo on a Stick: Integrated Optics for Holographic Video Displays, Ph. D. Thesis, Massachusetts Institute of Technology, 2013; D. E. Smalley, Q. Y. J. Smithwick, V. M. Bove, Jr., J. Barabas and S. Jolly, "Anisotropic leaky-mode modulator for holographic video displays," Nature, v. 498, pp. 313-317, 2013] employ scanning galvanometers to optically scan multiple holographic lines within the persistence time of the human eye. However, a flat-panel holographic video display requires that no supporting optics be used. Therefore, increased vertical resolution can only be achieved via the use of additional waveguide channels [D. E. Smalley, Holovideo on a Stick:

Integrated Optics for Holographic Video Displays, Ph. D. Thesis, Massachusetts Institute of Technology, 2013].

Figure 9:
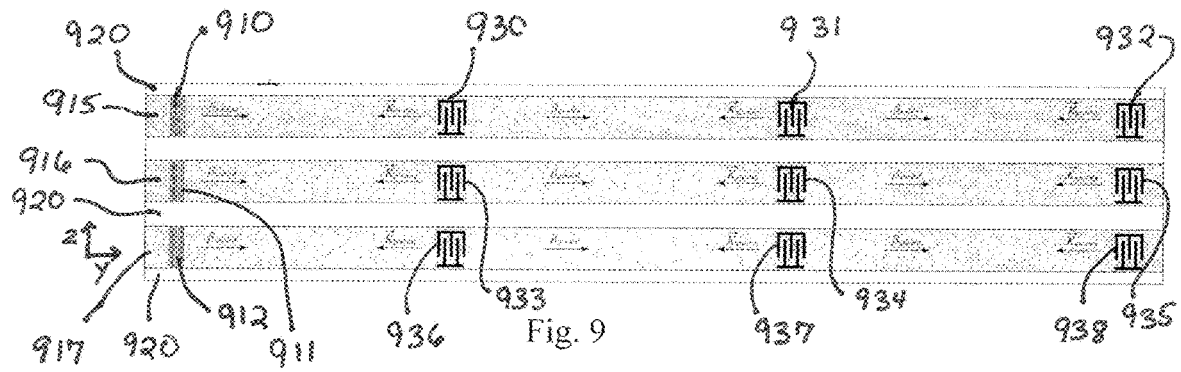
FIG. 9 is a z-y cross-section (top view) of an example multi-element, multi-channel SAW device, according to one aspect of the invention.

Such a scheme is depicted in FIG. 9, which depicts a z-y cross-section (top view) of an example multi-element, multi-channel SAW device, according to this aspect of the invention. In this scheme, light is coupled into all waveguides simultaneously via in-coupling Bragg gratings 910, 911, 912 that are positioned on top of each waveguide 915, 916, 917 on substrate 920. As in the example device shown in FIGS. 5 and 6, multiple SAW transducers 930, 931, 932, 933, 934, 935, 936, 937, 938 and reflection Bragg gratings 910, 911, 912 are positioned along the length of each waveguide 915, 916, 917.

In order to electrically drive the entire example multi-element, multi-channel device depicted in FIG. 9 with holographic information with the limited temporal bandwidth available from modern GPUs, each column of SAW elements spanning multiple waveguides may be driven by a single analog output channel of a graphics processing unit in a time-sequential fashion. This allows for the possibility of coherence amongst surface acoustic waves generated by multiple SAW transducer elements on a single waveguide, so that all of the holographic information spanning multiple SAW transducers on a single holographic line is drawn at the same time, as well as reduces the number of analog GPU channels needed.

Figure 10:
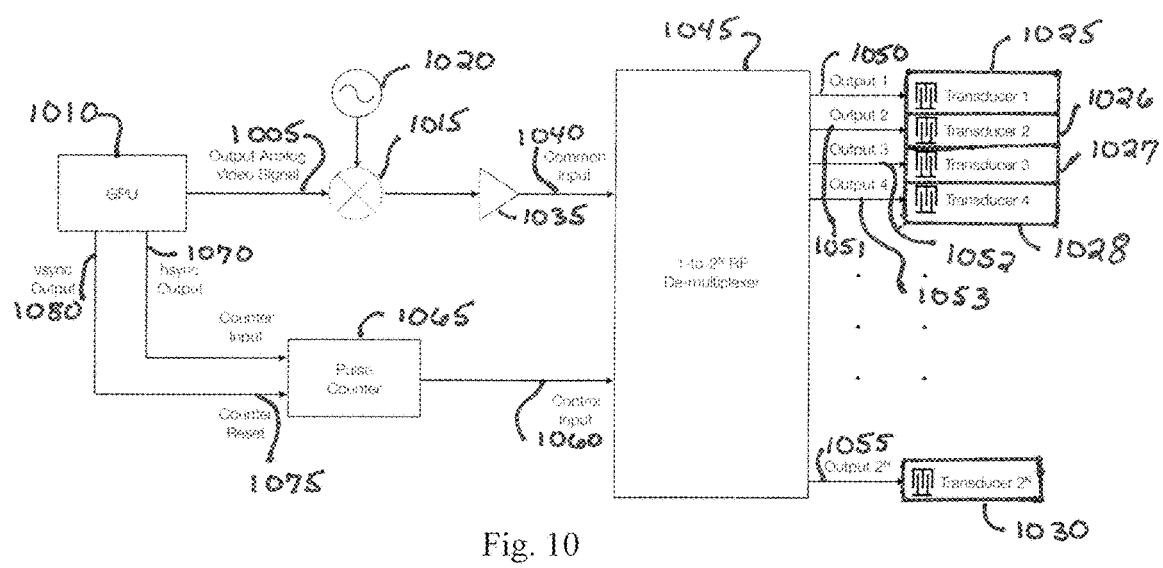
FIG. 10 depicts an example embodiment of an electrical control layer path for GPU signal output, RF up-conversion and amplification, and switching amongst holographic lines for driving multiple holographic lines in sequence, according to one aspect of the invention.

Such a scheme can be implemented via the use of an analog RF demultiplexer, as shown in FIG. 10. FIG. 10 depicts an example embodiment of an electrical path for GPU signal output, RF up-conversion and amplification, and switching amongst holographic lines for driving multiple holographic lines in sequence, according to one aspect of the invention. In FIG. 10, the output analog video signal 1005 from graphics card (GPU) 1010 (containing holographic information) is appropriately up-converted via RF mixer 1015 with local oscillator 1020 to the RF frequency operating band of SAW transducers 1025, 1026, 1027, 1028, 1030 and amplified by RF amplifier 1035. This up-converted, amplified signal 1040 is input to 1-to-2 RF de-multiplexer 1045, which acts to switch input signal 1040 to one of 2 outputs 1050, 1051, 1052, 1053, 1055 depending on control input 1060. Because input signal 1040 should be switched based on the index of the current holographic line being written, control input 1060 is the output of counter 1065 that accumulates the number of hsync pulses output 1070 from the GPU 1010. This control scheme necessitates that the holographic information driving a single transducer is contained on a single framebuffer line in the GPU's memory. During the duration between hsync pulses, the holographic information for the ith holographic line is drawn. After drawing is completed, the GPU 1010 fires an hsync pulse 1070, incrementing the pulse counter 1065, and thereby switching the output to a transducer on the next holographic line. After all lines have been switched to and drawn, counter 1065 is reset 1075 upon receiving a vsync pulse 1080 from GPU 1010 and de-multiplexer 1045 is thereby reset to output 1050 to the first holographic line's transducer 1025.

All independent sequential transducers per holographic line may be addressed by independent GPU channels and de-multiplexing hardware. In this way, multiple transducers per holographic line are addressed in a parallel fashion, while separate holographic lines are addressed in a serial fashion. Other variations on this addressing scheme, as would be known to those skilled in the art, may be used as appropriate for the number of lines, transducers, and simultaneous video signals available.

Fabrication via Femtosecond Laser Micromachining. Femtosecond laser micromachining has emerged in the last several decades as a versatile tool for the fabrication of microdevices in transparent materials [R. R. Gattass and E. Mazur, "Femtosecond laser micromachining in transparent materials," Nature Photonics, vol. 2, no. 4, pp. 219-225, April 2008]. The use of femtosecond laser micromachining has been explored for the generation of waveguides [M. Dubov, S. Boscolo, and D. J. Webb, "Microstructured waveguides in z-cut $LiNbO_3$ by high-repetition rate direct femtosecond laser inscription," Optical Materials Express, vol. 4, no. 8, pp. 1708-1716, August 2014; R. He, Q. An, Y. Jia, G. R. Castillo-Vega, J. R. V. de Aldana, and F. Chen, "Femtosecond laser micromachining of lithium niobate depressed cladding waveguides," Optical Materials Express, vol. 3, no. 9, pp. 1378-1384, September 2013; J. Burghoff, H. Hartung, S. Nolte, and A. Tünnermann, "Structural properties of femtosecond laser-induced modifications in LiNbO3," Applied Physics A, vol. 86, no. 2, pp. 165-170, 2007; J. Burghoff, S. Nolte, and A. Tünnermann, "Origins of waveguiding in femtosecond laser-structured LiNbO3," Applied Physics A, vol. 89, no. 1, pp. 127-132, 2007], surface gratings [D. Grando, J. Yu, D. Ballarini, and P. Galinetto, "Femtosecond Laser Writing of Surface Microstructures in Lithium Niobate," Nonlinear Guided Waves and Their Applications (2005), paper WD33, p. WD33, September 2005], Bragg volume gratings [V. Mizeikis, V. Purlys, D. Paipulas, and R. Buividas, "Direct Laser Writing: Versatile Tool for Microfabrication of Lithium Niobate," Journal of Laser Micro/Nanomachining, 2012; D. Paipulas, V. Kudriašov, M. Malinauskas, V. Smilgevičius, and V. Sirutkaitis, "Diffraction grating fabrication in lithium niobate and KDP crystals with femtosecond laser pulses," Applied Physics A, vol. 104, no. 3, pp. 769-773, 2011], and complex integrated optic devices [J. Thomas, M. Heinrich, P. Zeil, V. Hilbert, K. Rademaker, R. Riedel, S. Ringleb, C. Dubs, J. P. Ruske, S. Nolte, and A. Tünnermann, "Laser direct writing: Enabling monolithic and hybrid integrated solutions on the lithium niobate platform," Physica Status Solidi (a), vol. 208, no. 2, pp. 276-283, February 2011] in lithium niobate. Recently, the use of femtosecond laser micromachining has been proposed as an alternative to proton exchange for the creation of anisotropic waveguides in $LiNbO_3$ for spatial light modulators for holographic video devices [N. Savidis, S. Jolly, B. Datta, T. Karydis, and V. Michael Bove, Jr., "Fabrication of waveguide spatial light modulators via femtosecond laser micromachining," Proc. SPIE Advanced Fabrication Technologies for Micro/Nano Optics and Photonics IX, 9759, 2016].

While many fabrication methods for devices according to the invention are known in the art and would be suitable, in a preferred embodiment, a device according to the invention can be fabricated entirely via a femtosecond laser micromachining process. The anisotropic waveguide can be fabricated by an index change $\Delta n_e$, which has been shown to be possible via short duration pulse widths [J. Burghoff, H. Hartung, S. Nolte, and A. Tünnermann, "Structural properties of femtosecond laser-induced modifications in LiNbO3," Applied Physics A, vol. 86, no. 2, pp. 165-170, 2007], relative to the substrate. The Bragg in-coupling grating can be fabricated via surface ablation [D. Grando, J. Yu, D. Ballarini, and P. Galinetto, "Femtosecond Laser Writing of Surface Microstructures in Lithium Niobate," Nonlinear Guided Waves and Their Applications (2005), paper WD33, p. WD33, September 2005] or via refractive index modulation $\Delta n_e$ [D. Paipulas, V. Kudriašov, M. Malinauskas, V. Smilgevičius, and V. Sirutkaitis, "Diffraction grating fabrication in lithium niobate and KDP crystals with femtosecond laser pulses," Applied Physics A, vol. 104, no. 3, pp. 769-773, 2011]. The out-coupling grating can be fabricated via isotropic refractive index modulation in the bulk of the substrate. Metal SAW transducers may also be fabricated [T. Gertus, P. Každailis, R. Rimeika, D. Čiplys, and V. Smilgevičius, "Surface acoustic wave transducers fabricated by femtosecond laser ablation", Electronics Letters, vol. 46, no. 17, 19 Aug. 2010].

Figure 11:
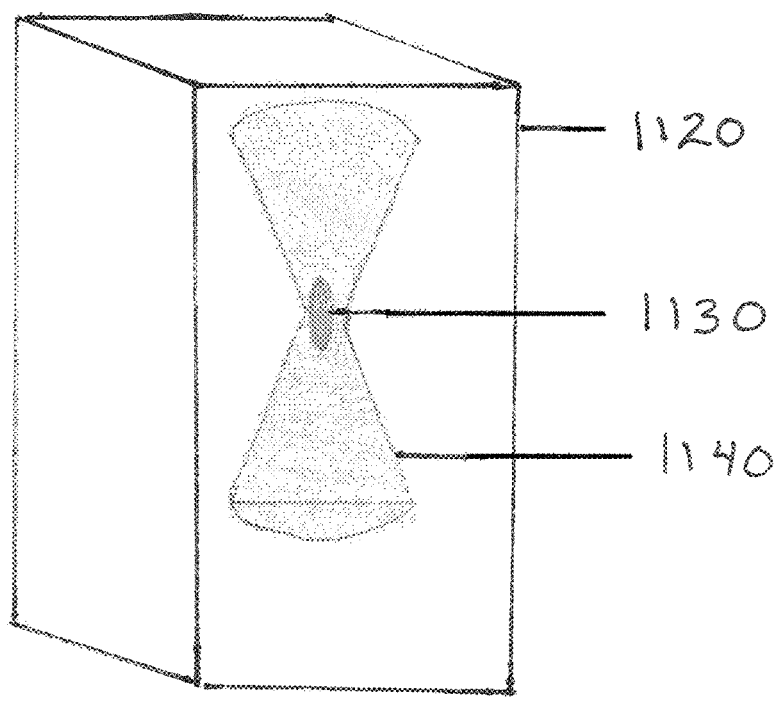
FIG. 11 depicts focused laser spot in femtosecond laser micromachining.

FIG. 11 depicts an example focused laser spot in femtosecond laser micromachining. Material perturbation or ablation only occurs within a small region around the focus. Shown in FIG. 11 are glass material 1120, absorption spot 1130, and caustic 1140.

Figures 12A, 12B, 12C:
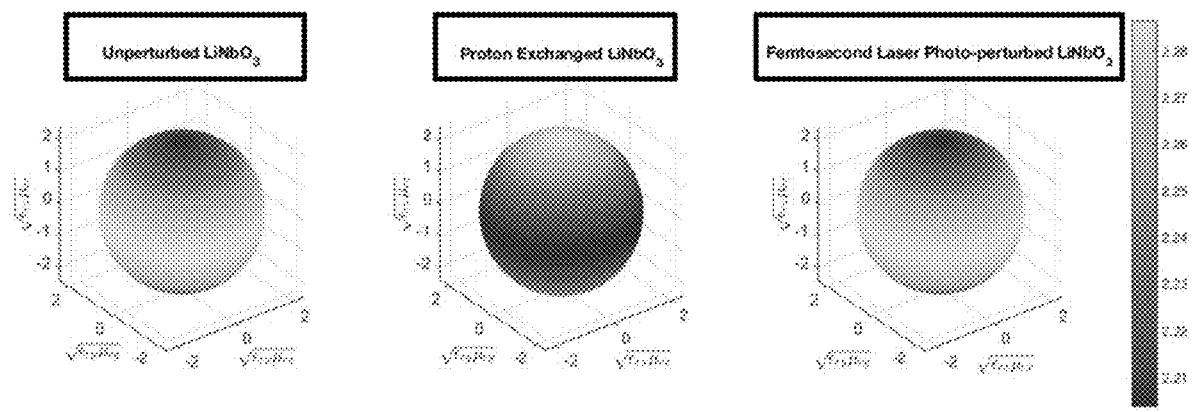

FIGS. 12A-C depict example index ellipsoids for uniaxial lithium niobate, wherein FIG. 12A depicts unperturbed $LiNbO_3$, FIG. 12B depicts proton-exchanged $LiNbO_3$, and FIG. 12C depicts femtosecond laser photo-perturbed $LiNbO_3$. While the proton exchange process in $LiNbO_3$ increases the extraordinary index while decreasing the ordinary index ($\Delta n \sim 10^{-2}$), femtosecond laser micromachining can induce an increase in extraordinary index only ($\Delta n_e \sim 10^{-3}$) (see FIG. 12) when creating so-called Type I waveguides [J. Burghoff, H. Hartung, S. Nolte, and A. Tünnermann, "Structural properties of femtosecond laser-induced modifications in LiNbO3," Applied Physics A, vol. 86, no. 2, pp. 165-170, 2007; J. Burghoff, S. Nolte, and A. Tünnermann, "Origins of waveguiding in femtosecond laser-structured LiNbO3," *Applied Physics A*, vol. 89, no. 1, pp. 127-132, 2007]. The effect of the waveguide's index profile on the guided-to-leaky mode conversion process is to be determined via simulation (i.e., coupled-mode theories dictating propagation in anisotropic waveguides [D. Marcuse, "Coupled-mode theory for anisotropic optical waveguides," The Bell System Technical Journal, vol. 54, no. 6, pp. 985-995, 1975] and interaction of guided-mode light with surface acoustic waves [A. M. Matteo, C. S. Tsai, and N. Do, "Collinear guided wave to leaky wave acoustooptic interactions in proton-exchanged $LiNbO_3$ waveguides," IEEE Trans. Ultrason., Ferroelect., Freq. Contr., vol. 47, no. 1, pp. 16-28]).

Other recent advances in fabrication using femtosecond laser micromachining may be suitable, such as femtosecond laser-based direct-write approaches for the fabrication of waveguide in-coupling gratings and volume Bragg reflection gratings via permanent refractive index changes within the lithium niobate substrate [Nickolaos Savidis, Sundeep Jolly, Bianca Datta, Michael Moebius, Thrasyvoulos Karydis, Eric Mazur, Neil Gershenfeld, and V. Michael Bove, Jr., "Progress in fabrication of waveguide spatial light modulators via femtosecond laser micromachining", Proc. SPIE Advanced Fabrication Technologies for Micro/Nano Optics and Photonics X, 10115, 2017]. In combination with metal surface-acoustic-wave transducers, these direct-write approaches allow for complete fabrication of a functional spatial light modulator via femtosecond laser direct writing.

Additionally, or alternatively, laser induced forward transfer (LIFT) [Bianca C. Datta, Nickolaos Savidis, Michael Moebius, Sundeep Jolly, Eric Mazur, and V. Michael Bove, Jr., "Direct-laser metal writing of surface acoustic wave transducers for integrated-optic spatial light modulators in lithium niobate", Proc. SPIE Advanced Fabrication Technologies for Micro/Nano Optics and Photonics X, 10115, 2017] may be employed for fabricating devices according to the invention. In this process, metal is placed on an optically transparent substrate, which is then placed against the target substrate. Specific patterns are written using a high-precision three axis stage to move the substrates. During LIFT, the laser is used to ablatively transfer material from a thin film on a support substrate to a target substrate by pulsed laser through a photothermal deposition process via vapor-driven propulsion of metal from the film onto the second (target) substrate. As the substrate material primarily experiences multi-photon effects (which are minimal here), absorption of laser energy occurs primarily at the metal-substrate interface since the majority of energy is absorbed by the metal, with laser light attenuation toward the surface of the metal film.

In addition to the foregoing, at least the following implementations, modifications, and applications of the described technology are contemplated by the inventors and are considered to be within the scope of the invention: pulsed illumination to create a stationary display output in conjunction with the use of traveling acoustic waves for index modulation, use of integrated volume reflection gratings to direct diffracted leaky-mode light towards a viewer, and use of an RF switching scheme in conjunction with an analog GPU output to allow for time-multiplexed, "rastered" operation.

While preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention.

What is claimed is:

1. A holographic video display comprising:
a plurality of space-multiplexed elemental modulators, wherein each elemental modulator is configured to employ leaky-mode diffraction of guided-mode light to produce a line of a holographic display, each elemental modulator comprising:
an anisotropic waveguide;
at least one in-coupling reflection grating positioned on the anisotropic waveguide at a location selected for coupling incident light into the waveguide to produce guided-mode light travelling in the waveguide, wherein the incident light is pulsed;
a plurality of surface acoustic wave transducers disposed along the top of the anisotropic waveguide, wherein each surface acoustic wave transducer is configured to diffract the guided-mode light travelling in the waveguide into leaky-mode light output that propagates away from a viewer, and wherein the plurality of surface acoustic wave transducers are positioned such that guided-mode light that is undiffracted by a first one of the plurality of transducers is available for diffraction by subsequent ones of the plurality of transducers, thereby producing a longer holographic line than would be possible with a single transducer; and
at least one output volume reflection grating positioned on the anisotropic waveguide, each output volume reflection grating being positioned at a location selected for steering the leaky-mode light output towards the viewer.

2. The holographic video display of claim 1, further comprising an electrical control layer, the electrical control layer comprising a graphics processing unit, circuitry for RF up-conversion and amplification, and a multiplexor for switching amongst holographic lines to drive multiple holographic lines in sequence to achieve time-multiplexed operation.

3. The holographic video display of claim 1, further comprising a substrate on which the plurality of elemental modulators are disposed.

4. The holographic video display of claim 3, wherein the substrate is lithium niobate.

5. The holographic video display of claim 1, wherein each anisotropic waveguide is divided into segments, each provided with separate illumination.

6. The holographic video display of claim 1, wherein the display is transparent and all reflection volume gratings operate in the Bragg regime.

7. The holographic video display of claim 1, wherein each anisotropic waveguide is associated with multiple one-to-one associated acoustic transducers and volume reflection gratings, arranged along the anisotropic waveguide to produce multiple output lines.

8. The holographic video display of claim 7, further comprising a substrate on which the plurality of elemental modulators are disposed.

9. The holographic video display of claim 1, wherein the plurality of acoustic transducers are disposed along the anisotropic waveguide in a manner that provides a specified length of optical line.

10. A holographic video image produced using the display of claim 1.

11. A method for generating a holographic image, comprising:
providing one or more wavelengths of incident light to a holographic video display, wherein the incident light is pulsed, the display comprising a plurality of space-multiplexed elemental modulators, wherein each elemental modulator is configured to employ leaky-mode diffraction of guided-mode light to produce a line of a holographic display, each elemental modulator comprising:
an anisotropic waveguide;
at least one in-coupling reflection grating positioned on the anisotropic waveguide at a location selected for coupling the incident light into the waveguide to produce guided-mode light travelling in the waveguide;
a plurality of surface acoustic wave transducers disposed along the top of the anisotropic waveguide, wherein each surface acoustic wave transducer is configured to diffract the guided-mode light travelling in the waveguide into leaky-mode light output that propagates away from the viewer, and wherein the plurality of surface acoustic wave transducers are positioned such that guided-mode light that is undiffracted by a first one of the plurality of transducers is available for diffraction by subsequent ones of the plurality of transducers, thereby producing a longer holographic line than would be possible with a single transducer; and
at least one output volume reflection grating positioned on the anisotropic waveguide, each output volume reflection grating being positioned at a location selected for steering the leaky-mode light output towards a viewer;
providing holographic information to the video display;
coupling the light received at the holographic video display into the elemental modulators for diffraction according to the holographic information; and
scanning the steered light to form the holographic image.

12. The method of claim 11, wherein the holographic video display further comprises an electrical control layer, the electrical control layer comprising a graphics processing unit, circuitry for RF up-conversion and amplification, and a multiplexor for switching amongst holographic lines to drive multiple holographic lines in sequence to achieve time-multiplexed operation.

13. The method of claim 11, wherein the holographic video display further comprises a substrate on which the plurality of elemental modulators are disposed.

14. The method of claim 13, wherein the substrate is lithium niobate.

15. The method of claim 11, wherein each anisotropic waveguide is divided into segments, each provided with separate illumination.

16. The method of claim 11, wherein the display is transparent and all reflection volume gratings operate in the Bragg regime.

17. The method of claim 11, wherein each anisotropic waveguide is associated with multiple one-to-one associated acoustic transducers and volume reflection gratings, arranged along the anisotropic waveguide to produce multiple output lines.

18. The method of claim 17, wherein the holographic video display further comprises a substrate on which the plurality of elemental modulators are disposed.

19. The method of claim 11, wherein the plurality of acoustic transducers are disposed along the anisotropic waveguide in a manner that provides a specified length of optical line.

20. A holographic video display that employs the method of claim 11.

* * * * *